Jan. 26, 1954  R. C. WINTER ET AL  2,667,316
RETRACTABLE AIRCRAFT UNDERCARRIAGE
Filed April 25, 1951
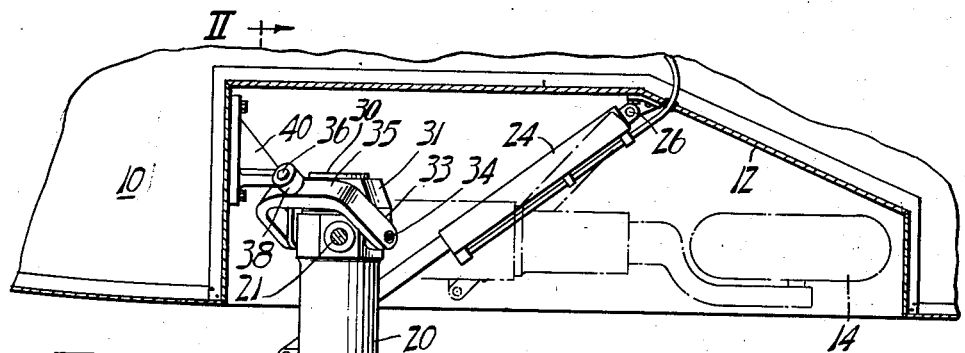
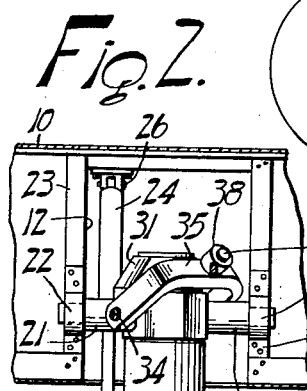
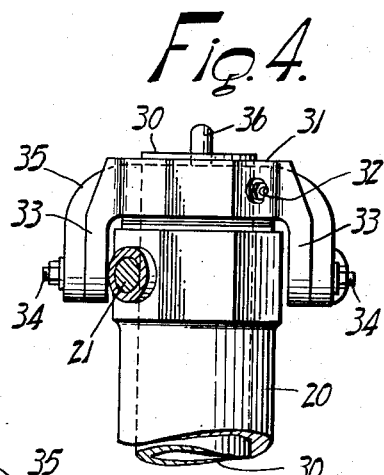
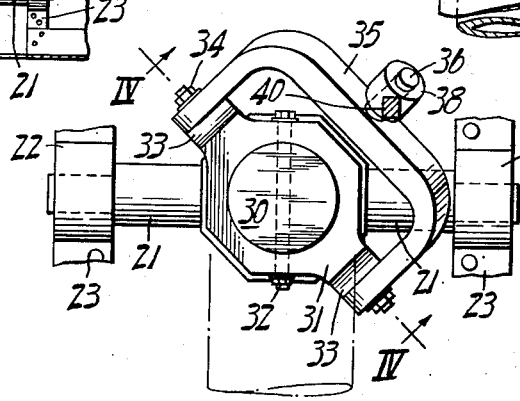
Inventors
Robert C. Winter and
John W. Wheeler
By
Bean, Brooks, Buckley & Bean
Attorneys Patented Jan. 26, 1954

UNITED STATES PATENT OFFICE 2,667,316

2,667,316

RETRACTABLE AIRCRAFT UNDERCARRIAGE

Robert C. Winter, Buffalo, and John W. Wheeler, Grand Island, N. Y., assignors to Bell Aircraft Corporation, Wheatfield, N. Y.

Application April 25, 1951, Serial No. 222,856

5 Claims. (Cl. 244—102)

This invention relates to aircraft retractable undercarriage devices, and more particularly to improvements in landing wheel strut devices of the type that provide for swinging of the strut from landing position into a recessed body portion of the aircraft while at the same time rotating automatically about its long axis so as to turn the landing wheel to fit substantially horizontally flatwise into the aircraft body recess.

Therefore it is an object of the present invention to provide in aircraft an improved retractable landing wheel strut of the type wherein incidental to fore and aft swinging of the strut in a flat plane between extended and retracted positions, the strut and landing wheel unit rotates automatically so as to dispose the wheel in fore and aft directional alignment when the gear is in extended position, and in substantially horizontally flatwise stowed position within a wheel well formed in the aircraft underbody when the gear is in retracted position. Other more specific objects and advantages of the invention will appear in the specification hereinafter.

In the drawings:

Fig. 1 is a fragmentary side elevational view of a landing gear unit embodying the present invention; the landing wheel and strut unit being shown by full lines in its extended position, and by broken lines in its retracted position;

Fig. 2 is a front elevational view of the landing gear unit of Fig. 1, shown in its extended or landing position;

Fig. 3 is a fragmentary top plan view, on a larger scale, of the unit of Figs. 1-2; and Fig. 4 is a fragmentary section taken along line IV—IV of Fig. 3.

As shown in the drawing, the invention may be embodied in an airplane structure including a body portion 10 which is recessed to provide a well formation as indicated at 12 for accommodation of an undercarriage strut carrying a landing wheel 14. The strut device includes a pair of telescopic members 16—18 which are angularly locked together as by means of a spline or key and keyway connection; and it will be understood that suitable shock absorbing means (not shown) may be installed within the unit so as to provide the strut assembly with desired shock absorbing characteristics, as is well known in the art. The outer strut member 18 is in turn rotatably mounted within a trunnion sleeve bracket 20; the upper end of which is equipped with diametrically extending pivot pin devices 21—21 engaging corresponding trunnion bearings 22—22 which are carried by brackets 23—23 forming parts of the braced structure of the aircraft body. The aligned axes of the pins 21—21 are disposed horizontally and transversely of the fore and aft axis of the aircraft, and thus the strut and wheel unit is thereby mounted upon the aircraft so as to swing in fore and aft directions therebelow. As shown in Fig. 1, a hydraulic jack or the like as indicated at 24 may be mounted as by means of connections 26—28 for actuating the wheel strut unit between extended and retracted positions thereof as shown by the solid line and broken line illustrations thereof respectively in Fig. 1. However, it will of course be appreciated that any other suitable means for swinging and bracing the wheel strut unit about the axis of the pins 21—21 may be employed if preferred.

To control the rotational position of the strut-wheel unit relative to the trunnion bracket 20 so as to automatically dispose the landing wheel in a position of fore and aft alignment when the gear is in extended position and to turn the wheel so as to lie flatwise within the well 12 when the gear is retracted, we provide a novel rotating control device as follows. The strut element 18 is formed to include an extension element 30 (Fig. 4) formed integrally therewith. At its upper end the strut extension element 30 carries a cap device 31 which is firmly fixed thereto as by means of a bolt 32 (Fig. 3). The cap 31 is formed with a pair of ears 33—33 hanging downwardly outside of the upper end of the trunnion bracket 20, and carrying corresponding pivot connection devices 34—34. The pivot connection devices 34—34 are arranged in diametrically opposed relation about the upright axis of the strut unit, but the axes of the pivot devices 34—34 are aligned in a direction at 45° to the direction of alignment of the trunnion bearing pins 21—21 (Fig. 3). The pivot connections 34—34 connect to the corresponding end portions of a yoke device 35 which includes a stub shaft portion 36 extending from the head thereof. The shaft 36 fits in rotational bearing relation with the bearing socket portion 38 of a bracket 40 (Fig. 1) which is fixed to the stationary frame work of the aircraft body.

The bearing socket portion 38 and the bracket 40 and the yoke device 35 are all so dimensioned and relatively arranged that the bracket bearing connection supports and maintains the stub shaft portion 36 of the yoke 35 to extend at a 45° angle from horizontal and at a 45° angle in plan view from the fore and aft directional axis of the aircraft. Thus, beginning for example from the position of extension of the gear, as the wheel strut is pulled rearwardly upon by the hydraulic jack 24 the control cap and yoke devices 31—35 cooperate to cause the strut wheel unit to rotate about the longitudinal axis thereof within the trunnion bracket sleeve 20 without interference with the free swinging movement thereof in a line straight fore and aft of the aircraft. This action of the cap and yoke devices 31—35 controls the wheel-strut unit so that as the strut approaches its horizontal broken line position thereof as shown in Fig. 1, the wheel has been rotated 90° and thus moves into the aircraft underbody well portion 12 in a straight flatwise attitude. Reversely, when the hydraulic jack is actuated to lower the gear the wheel-strut unit descends and swings forwardly toward the solid line extended position thereof as shown in Fig. 1, while at the same time the cap and yoke devices 31—35 operate automatically to cause the wheel to reverse rotate 90° and into its fore and aft directionally aligned attitude as shown in the drawing. In event the wheel needs to be rotated through an angle other than 90° as described hereinabove, the angles at which the stub shaft 36 extends from the upper end of the wheel-strut unit will be correspondingly adjusted away from the 45° angle arrangements as described hereinabove.

As stated hereinabove, it is a particular feature of the present invention that the mechanism thereof operates automatically to produce concurrent motion of the strut about two axes to provide the desired control of the wheel-strut unit while at the same time avoiding any binding of the relatively moving parts and necessity for swinging through an arc having a lateral component. It will also be appreciated that the mechanism of the present invention accomplishes the desired objects and effects through use of a greatly simplified structural mechanism comprising a minimum number of parts which are readily and inexpensively fabricated to be so rugged as to easily withstand the rigors of service. Furthermore, the strut mounting arrangement of the invention provides for most direct and efficient handling of the primary landing loads through the pivot supports of the gear; and thus the landing gear of the invention not only provides an improved mode of retraction operation, but also obtains the advantages thereof in combination with a structural organization which may readily and inexpensively be fabricated to be of extremely simple and light weight yet rugged characteristics.

What is claimed is:

1. An aircraft retractable landing gear including a trunnion bracket pivotally mounted upon the aircraft to swing in straight fore and aft directions thereon about a first axis, a wheel strut rotatably journaled within said trunnion bracket and extending therebelow for ground contact purposes, power means for swinging said bracket relative to the aircraft in fore and aft directions between extended and retracted positions, and wheel strut rotation control means comprising a first yoke member keyed to said rotatable wheel strut, and a second yoke member pivotally connected at corresponding opposite yoke arm end portions to said first yoke member along a second axis extending obliquely to said first axis, said second yoke member having a stub shaft head portion thereof rotatably retained within a fixed bearing portion of the aircraft structure.

2. An aircraft retractable landing gear comprising a trunnion bracket pivotally mounted upon the aircraft to swing in straight fore and aft directions thereon about a first axis, a wheel strut journaled within said trunnion bracket to be rotatable therein and extending therebelow for ground contact purposes, power means for swinging said bracket relative to the aircraft in fore and aft directions between extended and retracted positions, and wheel strut rotation control means comprising a first yoke member keyed to said rotatable wheel strut, and a second yoke member pivotally connected at corresponding opposite yoke arm end portions with said first yoke member, said second yoke member having a stub shaft head portion thereof rotatably retained within a fixed bearing portion of the aircraft structure and rotatable therein about a second axis, extending both horizontally and vertically obliquely relative to said first axis.

3. An aircraft retractable landing gear comprising a trunnion bracket pivotally mounted upon the aircraft to swing in straight fore and aft directions thereon about a first axis, a wheel strut journaled within said trunnion bracket for rotation and extending therebelow for ground contact purposes, power means for swinging said bracket relative to the aircraft in fore and aft directions between extended and retracted positions, and wheel strut rotation control means comprising a first yoke member keyed to said rotatable wheel strut, and a second yoke member pivotally connected at corresponding opposite yoke arm end portions to said first yoke member along a second axis extending obliquely relative to said first axis, said second yoke member having a stub shaft head portion thereof rotatably retained within a fixed bearing portion of the aircraft structure, and having an axis of rotation therein obliquely intersecting said first axis.

4. An aircraft retractable landing gear comprising a trunnion bracket pivotally mounted upon the aircraft to swing in straight fore and aft directions thereon, a wheel strut journaled within said trunnion bracket to be rotatable therein and extending therebelow for ground contact purposes, means for swinging said bracket relative to the aircraft in fore and aft directions between extended and retracted positions, and wheel strut rotation control means comprising a pair of yoke members pivotally connected to each other, one of said yoke members being keyed to said rotatable wheel strut, and the other of said yoke members having a stub shaft head portion thereof rotatably retained within a fixed bearing portion of the aircraft structure and rotatable therein about an axis skewed in two directions relative to the axis of pivoting of said trunnion bracket.

5. An aircraft retractable landing gear comprising a trunnion bracket pivotally mounted upon the aircraft to swing in straight fore and aft directions thereon, a wheel strut journaled within said trunnion bracket and rotatable therein and extending therebelow for ground contact purposes, means for swinging said bracket relative to the aircraft in fore and aft directions between extended and retracted positions, and wheel strut rotation control means comprising a first yoke member keyed to said rotatable wheel strut, and a second yoke member pivotally connected with said first yoke member, said second yoke member having a stub shaft head portion thereof rotatably retained within a fixed bearing portion of the aircraft structure and rotatable therein about an axis intersecting and inclined approximately 45 degrees horizontally and vertically away from the axis of pivoting of said trunnion bracket.

ROBERT C. WINTER.
JOHN W. WHEELER.

References Cited in the file of this patent
UNITED STATES PATENTS

| Number | Name | Date |
|---|---|---|
| 2,116,395 | Henrichsen | May 3, 1938 |

FOREIGN PATENTS

| Number | Country | Date |
|---|---|---|
| 486,748 | Great Britain | June 8, 1938 |
| 527,191 | Great Britain | Oct. 3, 1940 |